US012259002B2

(12) United States Patent
Sakota (10) Patent No.: US 12,259,002 B2
(45) Date of Patent: Mar. 25, 2025

(54) THRUST AIR BEARING

(71) Applicant: IHI Corporation, Tokyo (JP)

(72) Inventor: Koji Sakota, Tokyo (JP)

(*) Notice: Subject to any disclaimer, the term of this patent is extended or adjusted under 35 U.S.C. 154(b) by 70 days.

(21) Appl. No.: 18/308,677

(22) Filed: Apr. 28, 2023

(65) Prior Publication Data

US 2023/0258230 A1 Aug. 17, 2023

Related U.S. Application Data (63) Continuation of application No. PCT/JP2021/038633, filed on Oct. 19, 2021.

(30) Foreign Application Priority Data

Nov. 17, 2020 (JP) .................................. 2020-191066

(51) Int. Cl.
*F16C 17/04* (2006.01)

(52) U.S. Cl.
CPC ........ *F16C 17/042* (2013.01); *F16C 2360/00* (2013.01)

(58) Field of Classification Search
None
See application file for complete search history.

(56) References Cited

U.S. PATENT DOCUMENTS

| 4,178,046 A | 12/1979 | Silver et al. |
| 4,475,824 A | 10/1984 | Glaser et al. |
| 2002/0106138 A1 | 8/2002 | Akizuki et al. |
| 2015/0139573 A1 | 5/2015 | Klusacek |
| 2016/0195129 A1* | 7/2016 | Omori ................ F16C 17/042 384/105 |

FOREIGN PATENT DOCUMENTS

| JP | S58-160619 | 9/1983 |
| JP | S59-197614 | 11/1984 |
| JP | S62-072919 | 4/1987 |
| JP | S63-195412 | 8/1988 |
| JP | S52-143356 | 11/1997 |
| JP | 2001-227535 | 8/2001 |
| JP | 2002-195257 | 7/2002 |
| JP | 2009-185857 | 8/2009 |
| JP | 2011-144846 | 7/2011 |
| KR | 1020010063915 | 7/2001 |
| KR | 20190094806 A * | 8/2019 |

OTHER PUBLICATIONS

International Preliminary Report on Patentability with Written Opinion dated Jun. 1, 2023 for PCT/JP2021/038633.
International Search Report dated Dec. 28, 2021 for PCT/JP2021/038633.

* cited by examiner

*Primary Examiner* — James Pilkington
*Assistant Examiner* — Aimee Tran Nguyen
(74) *Attorney, Agent, or Firm* — SOEI PATENT & LAW FIRM (57) ABSTRACT

A thrust air bearing includes a plurality of foil units arranged in a circle. Each foil unit includes a top foil portion, and a bump foil portion integrally provided with the top foil portion and disposed opposite the top foil portion in a circumferential direction forming the circle. The foil unit is disposed such that the top foil portion lies on top of the bump foil portion of another adjacent foil unit.

20 Claims, 8 Drawing Sheets

THRUST AIR BEARING

CROSS-REFERENCE TO RELATED APPLICATIONS

This application is a continuation application of PCT Application No. PCT/JP2021/038633, filed on Oct. 19, 2021, which claims the benefit of priority from Japanese Patent Application No. 2020-191066, filed on Nov. 17, 2020. The entire contents of the above listed PCT and priority applications are incorporated herein by reference.

BACKGROUND

Field

The present disclosure relates to a thrust air bearing.

Description of the Related Art

Japanese Unexamined Patent Application Publication No. S63-195412 1 discloses an example of a thrust air bearing. This type of thrust air bearing includes a plurality of bump foils disposed equidistant from each other on a thrust surface, and further includes top foils disposed so as to lie on top of the bump foils. The bump foils and the top foils are individually fixed to the thrust surface by welding or the like.

SUMMARY

Disclosed herein is an example thrust air bearing supporting a rotating shaft, the thrust air bearing including a plurality of foil units arranged in a circle. Each foil unit includes a top foil portion, and a bump foil portion integrally provided with the top foil portion and disposed opposite the top foil portion in a circumferential direction forming the circle. The foil unit is disposed such that the top foil portion lies on top of the bump foil portion of another adjacent foil unit.

Some aspects of the present disclosure facilitate the attachment of the bump foil portion and the top foil portion.

DETAILED DESCRIPTION

In the following description, with reference to the drawings, the same reference numbers are assigned to the same components or to similar components having the same function, and overlapping description is omitted.

An example thrust air bearing supports a rotating shaft, the thrust air bearing including a plurality of foil units arranged in a circle. Each foil unit includes a top foil portion, and a bump foil portion integrally provided with the top foil portion and disposed opposite the top foil portion in a circumferential direction forming the circle. The foil unit is disposed such that the top foil portion lies on top of the bump foil portion of another adjacent foil unit.

In some examples, the thrust air bearing includes a plurality of foil units, and the top foil portion and the bump foil portion of each foil unit are integrally provided. That is, by attaching one foil unit, the top foil portion and the bump foil portion can be attached without misalignment. Additionally, disposing the foil units by arranging them in predetermined positions completes the installation of all of the top foil portions and the bump foil portions. As a result, the attachment of the bump foil portions and the top foil portions is facilitated compared to a case in which the bump foils and the top foils are individually attached.

In some examples, the thrust air bearing may further include an annular base plate to which the plurality of foil units is fixed, and a foil fixing portion fixing each foil unit to the base plate. Each foil unit may include a fix receiving portion provided between the top foil portion and the bump foil portion, and attached to the base plate by the foil fixing portion.

In some examples, the foil units may be removably attached to the base plate. When there is a defect in the foil unit, the defective foil unit can be removed from the base plate and can be easily changed to a new foil unit.

In some examples, the base plate may be provided with a positioning groove in which the fix receiving portion fits, and the positioning groove may be provided so as to extend in a radial direction of the annular base plate. The fix receiving portion may include an engaging projection portion engaging with the positioning groove, and a receiving recess portion with which the foil fixing portion engages on a side opposite the engaging projection portion. The foil units may be arranged in the circumferential direction. The foil units are positioned by the fix receiving portions fitted in the positioning grooves, and the positioning grooves are provided so as to extend in the radial direction of the annular base plate. As a result, positional misalignment of the foils units in a direction intersecting the radial direction, for example, positional misalignment in the circumferential direction can be suppressed.

In some examples, the base plate may include an outer circumferential edge and an inner circumferential edge opposite the outer circumferential edge in the radial direction. The positioning groove may be tapered such that a width in a circumferential direction of the base plate increases from an inner end portion close to the inner circumferential edge to an outer end portion close to the outer circumferential edge. The engaging projection portion may be tapered to engage with the positioning groove and may be pressure bonded to the positioning groove by the foil fixing portion. The fix receiving portion includes the engaging projection portion that engages with the positioning groove which is tapered in the radial direction, and the engaging projection portion is tapered to engage with the positioning groove. Thus, when the engaging projection portion is pressure bonded to the positioning groove by the foil fixing portion, the position of the engaging projection portion is corrected by the synergistic effect of the tapered shape of the engaging projection portion and the tapered shape of the positioning groove to enable positional misalignment in the radial direction to be suppressed.

In some examples, the positioning groove may include a bottom portion, and a pair of side portions rising from the bottom portion and facing each other in the circumferential direction. The pair of side portions may include a pair of inclined surfaces inclined such that a width in the circumferential direction gradually increases away from the bottom portion. The engaging projection portion may be inclined so as to engage with the pair of inclined surfaces, and may be pressure bonded to the inclined surfaces by the foil fixing portion. The inclined surfaces of the positioning groove are respectively formed on the side portions facing each other in the circumferential direction, and the engaging projection portion is inclined so as to engage with the pair of inclined surfaces. Thus, when the engaging projection portion is pressure bonded to the positioning groove by the foil fixing portion, the position of the engaging projection portion is corrected by the synergistic effect of the inclination of the engaging projection portion and the inclination of the inclined surfaces of the positioning groove to enable positional misalignment in the circumferential direction to be suppressed.

In some examples, the positioning groove may include a bottom portion, and there may be a gap extending in the radial direction between the bottom portion and the engaging projection portion. A cooling passage through which air can pass can be formed by the gap, so that a heat removal function can be performed.

In some examples, the positioning groove may be provided with a bulged portion spaced from the engaging projection portion in the circumferential direction and forming a gap region. Forming the gap region enables the engaging projection portion to be pulled out easily when the engaging projection portion is pulled out.

In some examples, the base plate may include an outer circumferential edge and an inner circumferential edge opposite the outer circumferential edge in the radial direction. The positioning groove may include an insertion opening open at the outer circumferential edge, and the engaging projection portion may be insertable from the insertion opening. The foil unit may be disposed such that the top foil portion lies on top of the bump foil portion of another foil unit. The aspect above facilitates the assembly of the thrust air bearing since the engaging projection portion of the foil unit can be attached by inserting the engaging projection portion into the insertion opening from a lateral side which does not interfere with other foil units.

Figure 1:
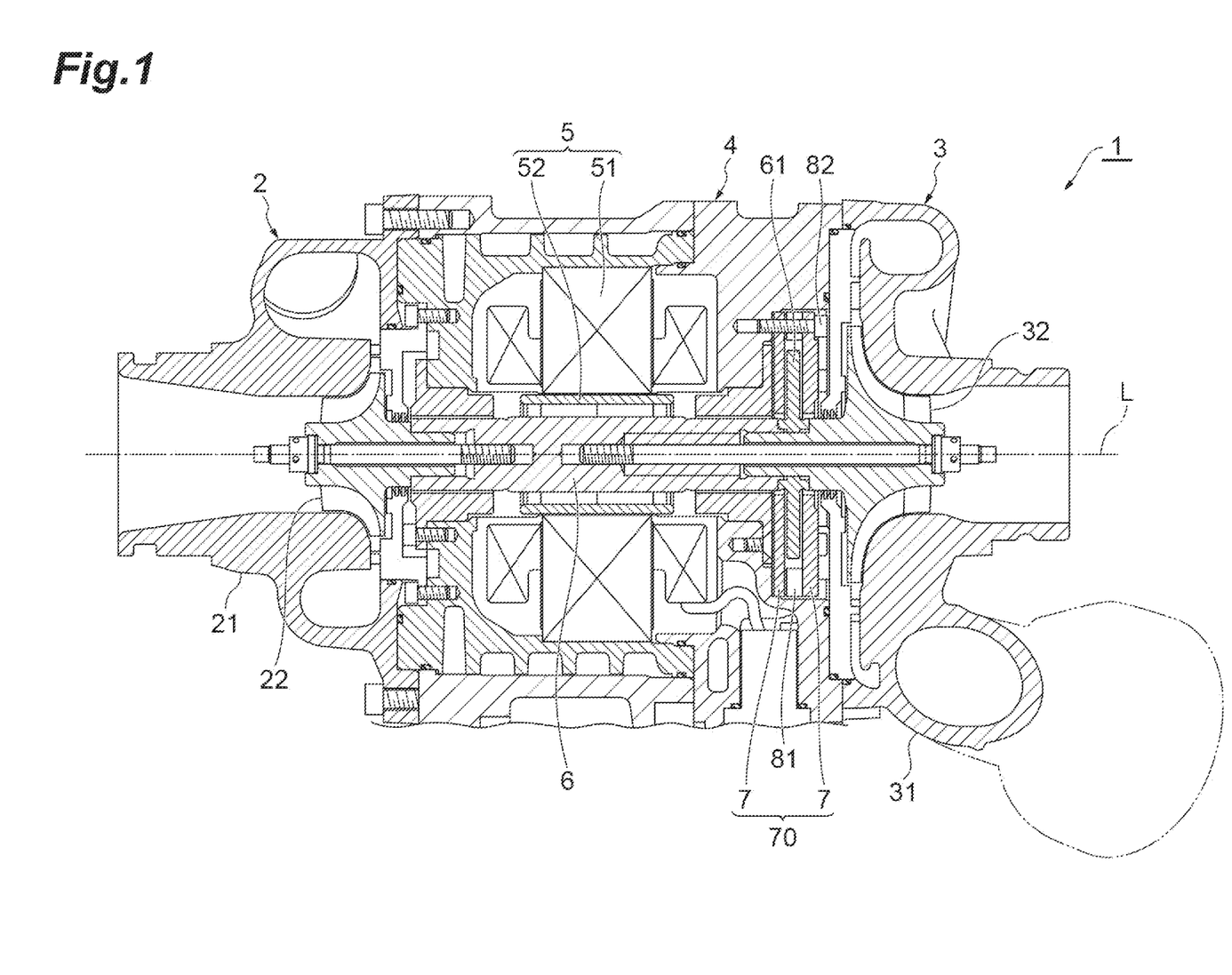
FIG. 1 is a cross-sectional view illustrating an example rotating machine including a thrust air bearing.

FIG. 1 illustrates an example of a rotating machine 1, which is, for example, an electric turbocharger. The rotating machine 1 includes a turbine 2 and a compressor 3, and includes an electric motor 5 that drives a rotating shaft 6 between the turbine 2 and the compressor 3. The turbine 2 includes a turbine impeller 22 disposed inside a turbine housing 21. The compressor 3 includes a compressor impeller 32 disposed inside a compressor housing 31. A motor housing 4 to which a stator 51 of the electric motor 5 is fixed is installed between the turbine housing 21 and the compressor housing 31.

The turbine impeller 22 is fixed to the rotating shaft 6 of the compressor impeller 32. The rotation of the turbine impeller 22 is transmitted to the compressor impeller 32 via the rotating shaft 6 to drive the compressor impeller 32 cooperatively with the electric motor 5. A rotor 52 that assists the rotation of the rotating shaft 6 cooperatively with the stator 51 is fixed to the rotating shaft 6. The rotating shaft 6 is rotatably supported by a plurality of bearings, at least one of which is an example thrust air bearing 7. The structure for supporting the rotating shaft 6 by the thrust air bearing 7 will be described.

The rotating shaft 6 includes a thrust collar 61 that is provided so as to project in a radial direction. In the present disclosure, the thrust collar 61 is disposed between the rotor 52 and the compressor impeller 32. The thrust collar 61 is disposed so as to be sandwiched between a pair of the thrust air bearings 7. Each thrust air bearing 7 includes a bearing surface 7a facing the thrust collar 61, and a back surface 7b opposite the bearing surface 7a (see FIG. 7A).

The thrust air bearings 7 are arranged side by side in a direction of an axis L (e.g., axial direction) of the rotating shaft 6. A spacer 81 for forming a space to accommodate the thrust collar 61 is disposed between the pair of thrust air bearings 7. The pair of thrust air bearings 7 is fastened together by a plurality of fastening bolts 82 so as to clamp the spacer 81. The plurality of fastening bolts 82 are installed equidistant from each other in a circumferential direction CD of the thrust air bearings 7. Each thrust air bearing 7 rotatably supports the rotating shaft 6. The pair of thrust air bearings 7 also forms a shaft support structure 70 to cooperatively suppress misalignment of the thrust collar 61 in the direction of the axis L.

In the description below, for example, the thrust air bearing 7 closer to the rotor 52 may be referred to as a first thrust air bearing 7, and the thrust air bearing 7 closer to the compressor impeller 32 may be referred to as a second thrust air bearing 7. The back surface 7b of the first thrust air bearing 7 is supported by a member forming the motor housing 4, and is positioned in a predetermined position (see FIG. 7A). The back surface 7b of the second thrust air bearing 7 is supported by a portion of a member forming a portion of the compressor housing 31, and is positioned in a predetermined position. For examples in which the first thrust air bearing 7 and the second thrust air bearing 7 may be of essentially identical structure, the first thrust air bearing 7 will be representatively described.

Figure 2:
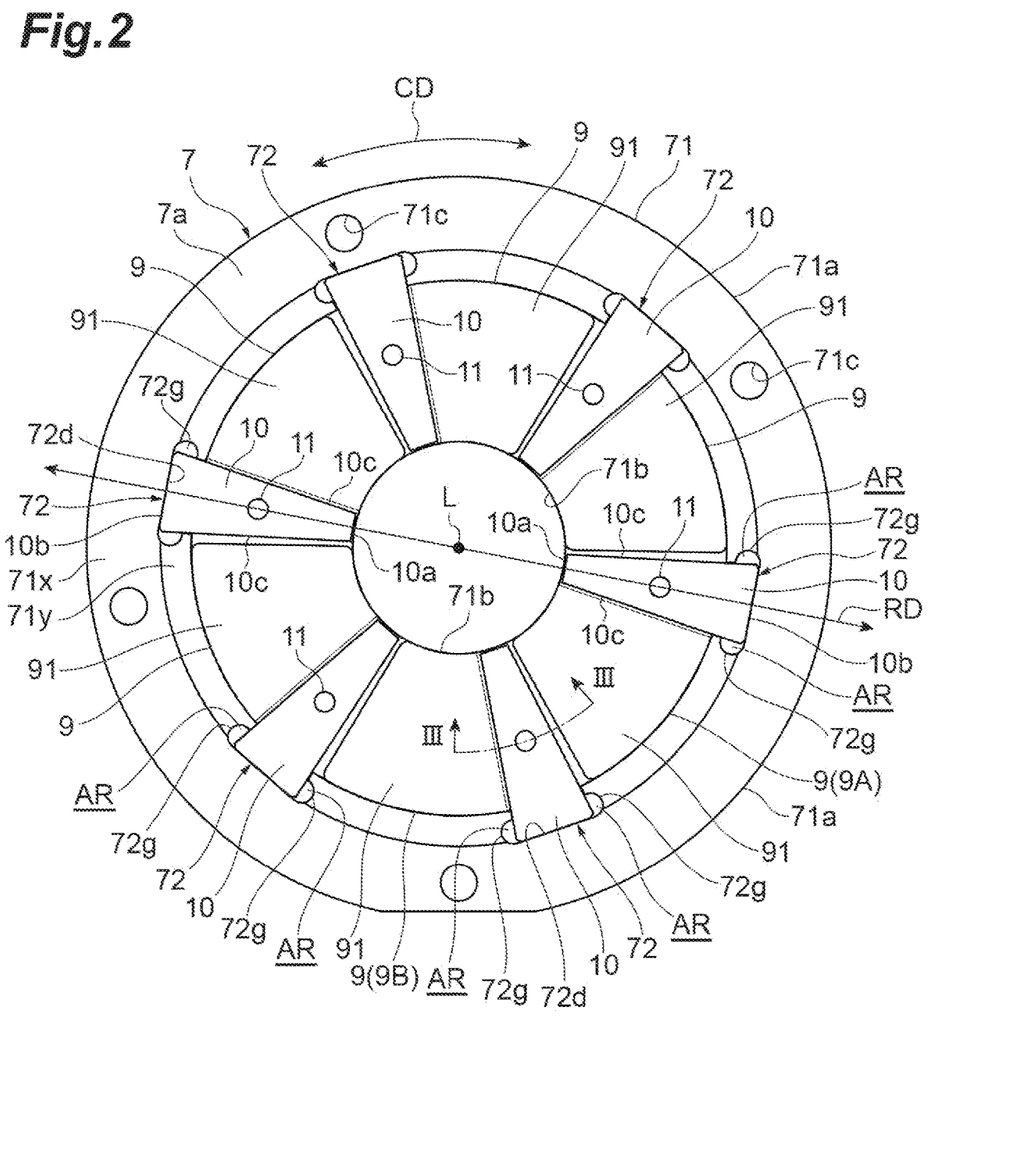
FIG. 2 is a plan view of an example thrust air bearing.
Figure 3:
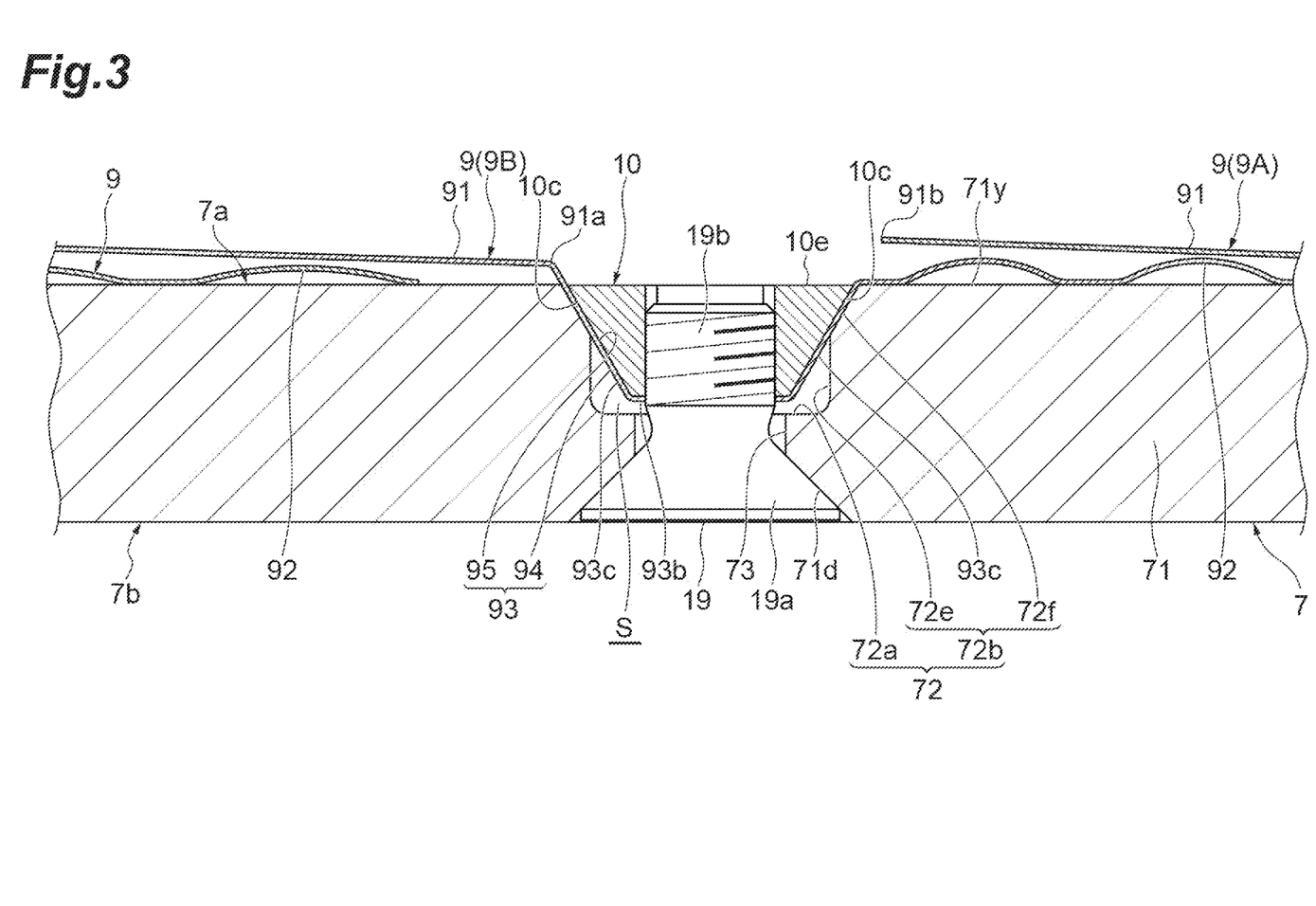
FIG. 3 is a cross-sectional view taken along line III-III of FIG. 2.
Figure 6:
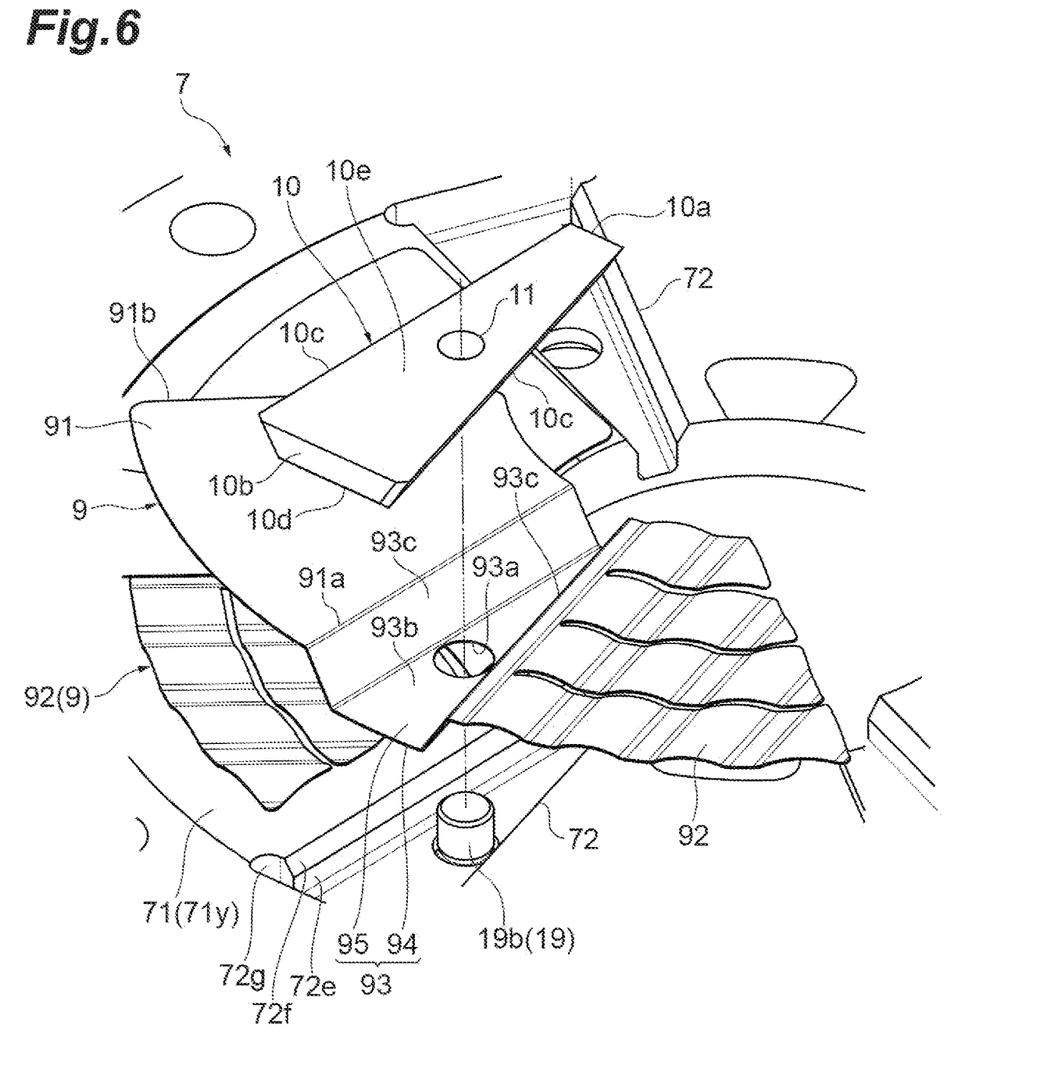
FIG. 6 is an exploded perspective view illustrating a portion of an example thrust air bearing.

As illustrated in FIGS. 2, 3, and 6, the thrust air bearing 7 includes an annular base plate 71 that serves as a base, a plurality of foil units 9 attached to the base plate 71, and foil fixing portions 10 that fix the foil units 9 to the base plate 71. The surface on which the plurality of foil units 9 is installed relative to the base plate 71 is the bearing surface 7a that faces the thrust collar 61, and the side opposite is the back surface 7b.

The base plate 71 is located around the rotating shaft 6. The base plate 71 (see FIG. 5) is annular (donut-shaped) and includes a substantially circular center hole CH through which the rotating shaft 6 is inserted. A radial direction RD of the base plate 71 may refer to both a centrifugal direction and a direction opposite the centrifugal direction with the axis L of the rotating shaft 6 as the center, assuming that the rotating shaft 6 is inserted through the center hole CH. For example, the radial direction RD refers to a direction perpendicular to the axis L, and additionally the circumferential direction CD of the base plate 71 refers to a direction in which the rotating shaft 6 rotates. For those examples in which the base plate 71 has a substantially circular external shape, the circumferential direction CD of the base plate 71 may be described as a direction along the substantially circular external shape of the base plate 71.

The base plate 71 includes an outer circumferential edge 71a (e.g., outer circumferential surface) that forms the substantially circular external shape, and an inner circumferential edge 71b (e.g., inner circumferential surface) that is opposite the outer circumferential edge 71a in the radial direction RD and forms the center hole CH. The inner circumferential edge 71*b* is located around the shaft 6. A plurality of foil units 9 faces the base plate 71 in the axial direction of the shaft 6. A plurality of foil units 9 is annularly located around the inner circumferential edge 71*b*. The base plate 71 can be perceived as being divided in two regions in the radial direction RD and, for example, includes an annular outer region 71*x* which includes the outer circumferential edge 71*a*, and an annular inner region 71*y* which includes the inner circumferential edge 71*b*. A step may be formed between the outer region 71*x* and the inner region 71*y*. In the present disclosure, a step descending from the outer region 71*x* to the inner region 71*y* is formed on the bearing surface 7*a*. A plurality of through holes 71*c* into which the fastening bolts 82 (see FIG. 1) are inserted is formed in the outer region 71*x* of the base plate 71. The foil units 9 are arranged along the circumferential direction CD in the inner region 71*y* of the base plate 71.

The inner region 71*y* of the base plate 71 is provided with a plurality of positioning grooves 72 for positioning the foil units 9 and a plurality of through holes 73. The through holes 73 are formed from the back surface 7*b* of the base plate 71 so as to exit bottom portions 72*a* of the positioning grooves 72. A countersunk screw 19 (fastening portion) that fixes the foil unit 9 passes through each through hole 73 (see FIG. 3). A countersink 71*d* in which a head portion 19*a* of the countersunk screw 19 fits is formed on the back surface 7*b* side of the through hole 73. The countersunk screw 19 is inserted from the back surface 7*b* toward the through hole 73.

The foil unit 9 (see FIGS. 4B and 6) is flexible and leaf-shaped (plate-shaped). For example, the foil unit 9 has an arc-shape. The inner region 71*y* of the base plate 71 is annular (donut-shaped) in a plan view. The foil unit 9 is shaped so as to evenly divide the inner region 71*y* in the circumferential direction CD in a plan view. In the description below, the circumferential direction CD of the foil unit 9 substantially refers to the same direction as the circumferential direction CD of the base plate 71, assuming that the foil unit 9 is installed in the base plate 71. The foil unit 9 includes a top foil portion 91 on one side in the circumferential direction CD, and a bump foil portion 92 on a side opposite the top foil portion 91. Additionally, a fix receiving portion 93 is provided between the top foil portion 91 and the bump foil portion 92. The fix receiving portion 93 integrally connects the top foil portion 91 to the bump foil portion 92.

Figure 4A:
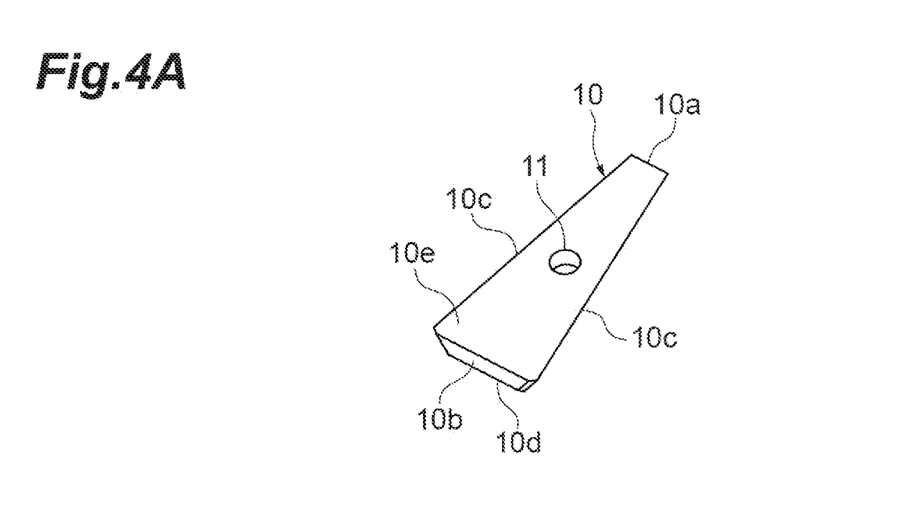
FIG. 4A is a portion of an example thrust air bearing in a perspective view illustrating a foil fixing portion.
Figure 4B:
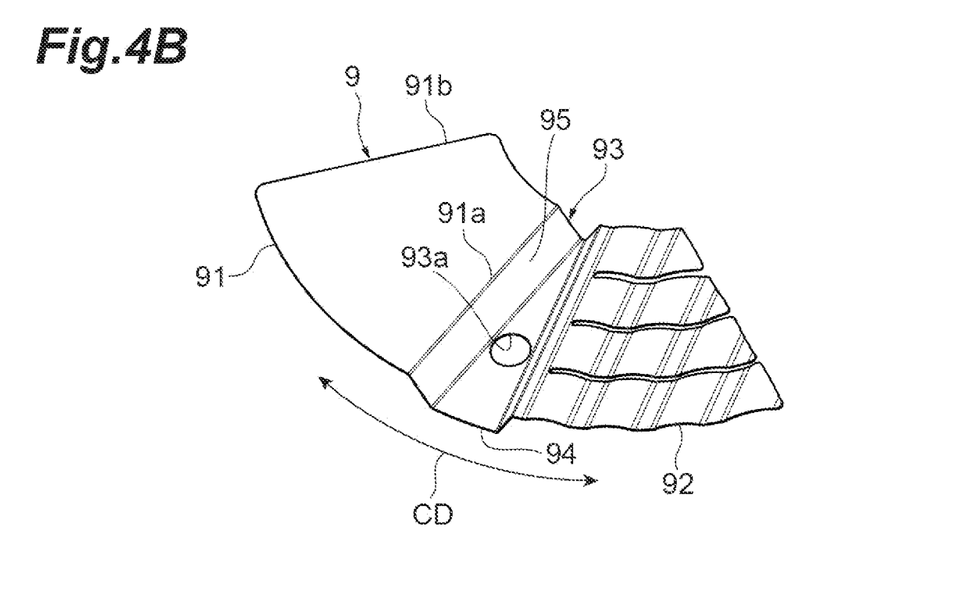
FIG. 4B is a portion of an example thrust air bearing in a perspective view illustrating an example foil unit.

The fix receiving portion 93 includes an engaging projection portion 94 (e.g., projection portion) that is bent so as to protrude from the top foil portion 91 and the bump foil portion 92. The engaging projection portion 94 has dimensions and shape such that it can fit in the positioning groove 72 of the base plate 71. The foil unit 9 is positioned in a predetermined position of the base plate 71 by fitting the engaging projection portion 94 in the positioning groove 72. The fix receiving portion 93 has a receiving recess portion 95 (e.g., recess portion), with which the foil fixing portion 10 engages, on a back side of the engaging projection portion 94, that is, on an opposite side of the engaging projection portion 94. A connecting hole 93*a* through which a shaft portion 19*b* of the countersunk screw 19 is inserted is formed in a bottom plate portion 93*b* which is the bottom of the receiving recess portion 95.

The foil fixing portion 10 (see FIGS. 4A and 6) has dimensions and shape such that it can fit in the receiving recess portion 95, and substantially engages with the receiving recess portion 95. A screw hole 11 into which the shaft portion 19*b* of the countersunk screw 19 is screwed is formed in the foil fixing portion 10. The foil fixing portion 10 is pressure bonded to the receiving recess portion 95 by screwing the countersunk screw 19 into the foil fixing portion 10 to fasten the countersunk screw 19, so that the fix receiving portion 93 is clamped between the foil fixing portion 10 and the positioning groove 72.

As illustrated in FIG. 2, the foil units 9 are uniformly arranged in the circumferential direction CD in the inner region 71*y* of the base plate 71, and are disposed so as to cover all or a portion of the annular inner region 71*y* as a whole. The top foil portion 91 of one of the foil units 9 is disposed so as to lie on top of the bump foil portion 92 of another adjacent foil unit 9. For example, six (a plurality of) foil units 9 are annularly arranged so as to be located around the rotating shaft 6. For example, the top foil portion 91 of a first foil unit 9A lies on top of the bump foil portion 92 of a second foil unit 9B located adjacent to the first foil unit 9A. The top foil portion 91 of the first foil unit 9A faces the bump foil portion 92 of the second foil unit 9B in the axial direction of the shaft 6.

As illustrated in FIGS. 3 and 6, the bump foil portion 92 has an undulating plate shape in a cross-sectional view, and is disposed so as to follow the surface of the inner region 71*y* of the base plate 71. The top foil portion 91 has a flat plate shape. The top foil portion 91 is disposed on the bump foil portion 92 in the axial direction of the rotating shaft 6. The top foil portion 91 is inclined such that a leading end portion 91*b* is spaced further away from the bump foil portion 92 than a root portion 91*a* connected to the fix receiving portion 93. The position of the bump foil portion 92 in the circumferential direction CD is on a front side in a direction of rotation of the rotating shaft 6 on the basis of one foil unit 9 installed in the base plate 71. Conversely, the position of the top foil portion 91 in the circumferential direction CD is on a rear side in the direction of rotation.

The shapes and engaging relationships of the positioning groove 72 of the base plate 71, the fix receiving portion 93 of the foil unit 9, and the foil fixing portion 10 will next be described further in detail with reference to FIGS. 3 to 6.

Figure 5:
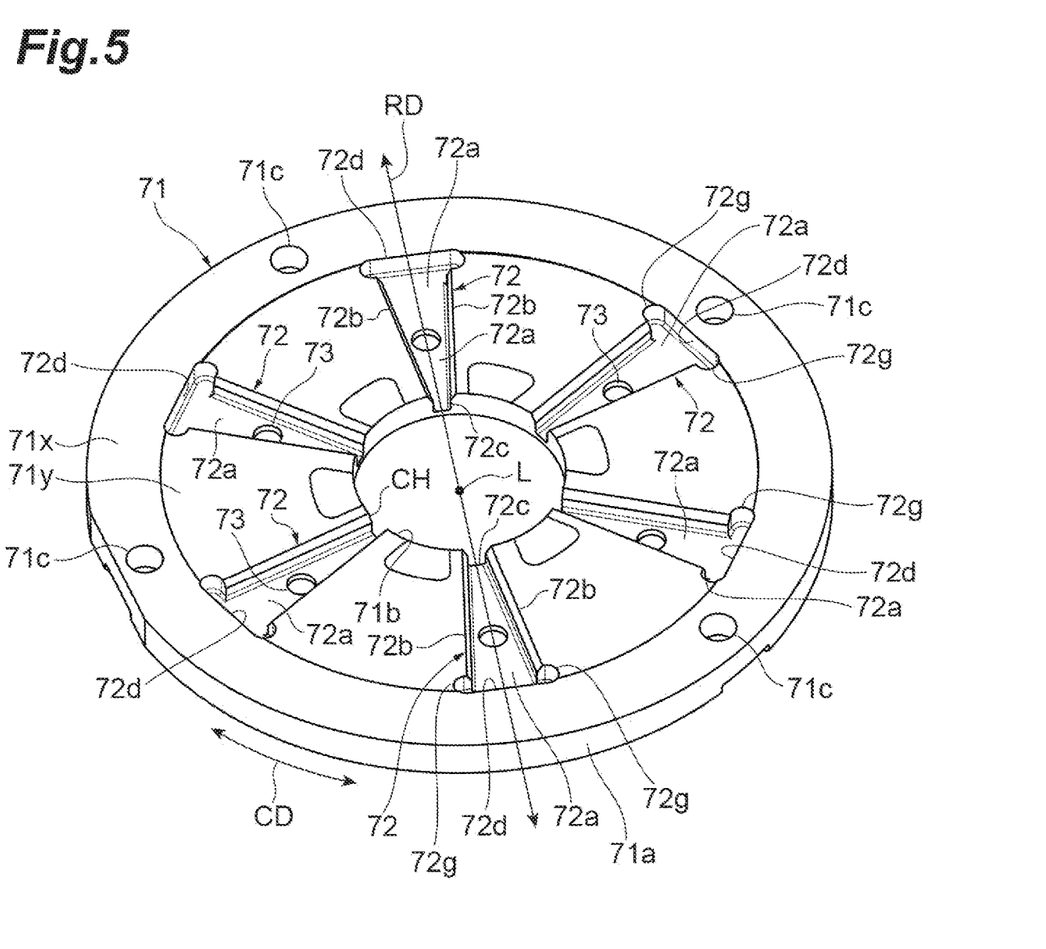
FIG. 5 is a perspective view of an example base plate.

The base plate 71 is provided with the same number of the positioning grooves 72 as the number of the foil units 9 to be installed. The positioning grooves 72 are provided so as to extend in the radial direction RD (centrifugal direction) of the annular base plate 71. The positioning grooves 72 are disposed equidistant from each other in the circumferential direction CD. Each positioning groove 72 includes an inner end portion 72*c* close to the inner circumferential edge 71*b* of the base plate 71, and an outer end portion 72*d* opposite the inner end portion 72*c* in the radial direction RD and close to the outer circumferential edge 71*a* of the base plate 71. The inner end portion 72*c* of the present disclosure reaches the inner circumferential edge 71*b* of the base plate 71 and is open. The outer end portion 72*d* of the present disclosure reaches the boundary between the inner region 71*y* and the outer region 71*x* of the base plate 71. In a plan view, the positioning groove 72 has a width greater at the outer end portion 72*d* than at the inner end portion 72*c*, and is tapered with the width in the circumferential direction CD increasing from the inner end portion 72*c* toward the outer end portion 72*d*.

The positioning groove 72 includes the bottom portion 72*a* and a pair of side portions 72*b* rising from the bottom portion 72*a*. The bottom portion 72*a* communicates with the through hole 73 into which the shaft portion 19*b* of the countersunk screw 19 is inserted. The pair of side portions 72*b* (see FIG. 5) is provided so as to face each other in the circumferential direction CD of the base plate 71, and extends in the radial direction RD to be connected to the inner end portion 72c and the outer end portion 72d.

The side portion 72b of the present disclosure (see FIG. 3) includes a vertical wall surface 72e rising substantially vertically from the bottom portion 72a, and an inclined surface 72f bent from the vertical wall surface 72e and rising at an angle from the vertical wall surface 72e. The inclined surface 72f is connected to a surface of the inner region 71y supporting the bump foil portion 92. A pair of the inclined surfaces 72f is disposed so as to face each other, and is inclined such that the distance therebetween gradually increases away from the bottom portion 72a. For example, the pair of the inclined surfaces 72f is inclined such that a width in the circumferential direction CD of the base plate 71 gradually increases away from the bottom portion 72a.

The fix receiving portion 93 (e.g., connecting portion) of the foil unit 9 is located between the top foil portion 91 and the bump foil portion 92. The fix receiving portion 93 is integrally connects the top foil portion 91 and the bump foil portion 92. The fix receiving portion 93 is bent from the top foil portion 91 and the bump foil portion 92, and formed so as to be substantially trapezoidal in a cross-sectional view. For example, the fix receiving portion 93 includes the bottom plate portion 93b and a pair of side plate portions 93c. The bottom plate portion 93b faces the bottom portion 72a of the positioning groove 72. The pair of side plate portions 93c is bent from the bottom plate portion 93b and is each respectively connected to the top foil portion 91 and the bump foil portion 92. The pair of side plate portions 93c is tapered in a plan view so as to engage with the positioning groove 72 (see FIG. 6). When the fix receiving portion 93 is engaged with the positioning groove 72, the outer surface portion that contacts the positioning groove 72 is the engaging projection portion 94, and the opposite inner surface portion is the receiving recess portion 95.

The bottom plate portion 93b has a shape conforming to the tapered shape of the positioning groove 72 in a plan view, and for example, is a substantially isosceles triangle having a short side portion and two long side portions of equal length. The vertical angle portion of the bottom plate portion 93b is disposed so as to follow along the inner end portion 72c of the positioning groove 72, and the short side portion is disposed so as to follow along the outer end portion 72d of the positioning groove 72. The side plate portions 93c are vertically arranged from the two long side portions of the bottom plate portion 93b, and are inclined such that the distance therebetween gradually increases away from the bottom plate portion 93b. The angle of inclination of the side plate portions 93c is substantially the same as the angle of inclination of the inclined surfaces 72f of the positioning groove 72. As a result, the outer sides of the side plate portions 93c, that is, portions of the engaging projection portion 94 are inclined so as to engage with the inclined surfaces 72f of the positioning groove 72. It should be noted that the bottom plate portion 93b of the present disclosure is spaced from wall surfaces of the positioning groove 72.

The foil fixing portion 10 engages with the receiving recess portion 95 of the fix receiving portion 93. The foil fixing portion 10 has, for example, a substantially isosceles trapezoidal shape in a plan view, and includes an inner end surface portion 10a that is installed so as to follow along the inner end portion 72c of the positioning groove 72, an outer end surface portion 10b that is installed so as to follow along the outer end portion 72d, and a pair of side surface portions 10c of equal length. The pair of side surface portions 10c is tapered in a plan view conforming to the pair of side plate portions 93c of the fix receiving portion 93, and is installed so as to abut the pair of side plate portions 93c.

The foil fixing portion 10 has, for example, a substantially isosceles trapezoidal shape in a cross-sectional view (see FIG. 3). The foil fixing portion 10 (see FIG. 6) includes a lower surface portion 10d that faces the bottom plate portion 93b of the fix receiving portion 93, an upper surface portion 10e opposite the lower surface portion 10d, and the pair of side surface portions 10c. The pair of side surface portions 10c is inclined such that a width therebetween gradually increases away from the lower surface portion 10d. The angle of inclination of the side surface portions 10c is substantially the same as the angle of inclination of the side plate portions 93c. As a result, the side surface portions 10c are inclined so as to engage with the side plate portions 93c.

As illustrated in FIG. 3, when the engaging projection portion 94 is engaged with the positioning groove 72, a gap S is formed between the bottom portion 72a of the positioning groove 72 and the engaging projection portion 94. That is, the positioning groove 72 and the engaging projection portion 94 are formed in dimensions so as to allow for the gap S to be formed. As a result, when the engaging projection portion 94 is pressed by the foil fixing portion 10, small misalignments are corrected, so that the engaging projection portion 94 can be pressure bonded to the side portion 72b, for example the inclined surface 72f, of the positioning groove 72.

The gap S extends in the radial direction RD from the inner circumferential edge 71b to the outer circumferential edge 71a of the base plate 71. A cooling passage through which air can pass can be formed by the gap S, and as a result, a heat removal function can be performed.

As illustrated in FIGS. 2 and 6, the outer end portion 72d of the positioning groove 72 is provided with a bulged portion 72g. The bulged portion 72g is a groove that communicates with the positioning groove 72. The bulged portion 72g is provided so as to be spaced from the engaging projection portion 94 in the circumferential direction CD, and forms a gap region AR which does not contact the engaging projection portion 94. The engaging projection portion 94 can be easily pulled out by inserting a tool or the like into the gap region AR when it is pulled out the engaging projection portion 94. Additionally, a cooling passage through which air can pass is formed by allowing the gap region AR to communicate with the gap S formed in the bottom portion 72a of the positioning groove 72, so that a heat removal function can be performed. In the present disclosure, the bulged portion 72g communicates with the gap S.

An example of a method for assembling the foil unit 9 to the base plate 71 will be described with reference to FIG. 6. The foil units 9 are located so as to face the base plate 71 in the axial direction of the rotating shaft 6. The foil units 9 are annularly arranged on the inner region 71y of the base plate 71 so as to be located around the rotating shaft 6. The foil units 9 are temporarily placed by inserting the fix receiving portions 93 into the positioning grooves 72, so that the orientation and the positions in the circumferential direction CD and the radial direction RD of the foil units 9 can be easily adjusted.

The foil fixing portion 10 is then press fit into the receiving recess portion 95 of the foil unit 9, and at the same time, the countersunk screw 19 is inserted from the back surface 7b of the base plate 71 to be screwed together with the foil fixing portion 10. The foil fixing portion 10 engages with the receiving recess portion 95 of the foil unit 9 so as to expand the receiving recess portion 95 due to the tightening of the countersunk screw 19. As a result, the engaging projection portion 94, which is the back side of the receiving recess portion 95, is pressure bonded to the inclined surfaces 72f of the positioning groove 72 and may be engaged therewith.

When the fastening of all the foil units 9 by the countersunk screws 19 and the foil fixing portions 10 is completed, the assembly of the foil units 9 to the base plate 71 is completed. The pair of thrust air bearings 7 for which the assembly of the foil units 9 is completed is installed in the rotating machine 1 so as to sandwich the thrust collar 61. Here, the head portions 19a of the countersunk screws 19 are disposed on the back surfaces 7b of the pair of thrust air bearings 7. The head portions 19a of the countersunk screws 19 that are present on the back surface 7b of the first thrust air bearing 7 are disposed so as to be held down by the motor housing 4 (see FIGS. 3 and 7A). The head portions 19a of the countersunk screws 19 that are present on the back surface 7b of the second thrust air bearing 7 are disposed so as to be held down by the compressor housing 31. As a result, loosening of the countersunk screws 19 that causes misalignment of the foil units 9 from the base plate 71 can be suppressed, and the bearing function of the thrust air bearings 7 can be stably maintained.

Figure 7A:
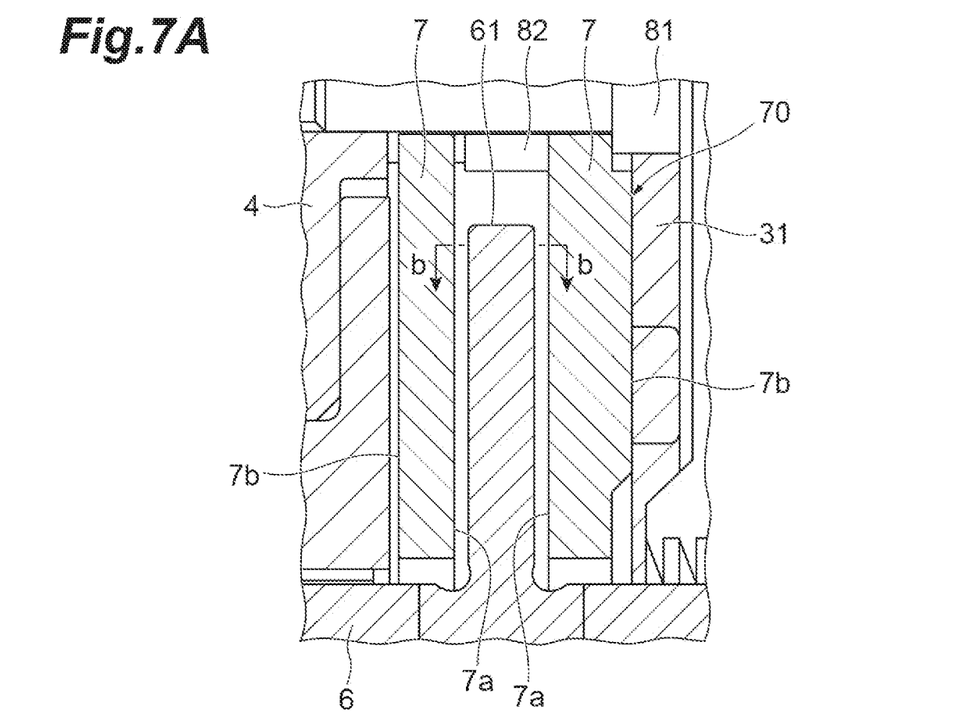
FIG. 7A illustrates an example thrust air bearing installed in an example rotating machine in an enlarged cross-sectional view showing a portion of the thrust air bearing.

The action of the thrust air bearings 7 rotatably supporting the rotating shaft 6 will next be described with reference to FIG. 7. As illustrated in FIG. 7A, the pair of thrust air bearings 7 is disposed so as to sandwich the thrust collar 61 fixed to the rotating shaft 6, and forms the shaft support structure 70. In a resting state, that is, when not rotating, the leading end portion 91b of the top foil portion 91 of the foil unit 9 is in contact with the thrust collar 61.

Figure 7B:
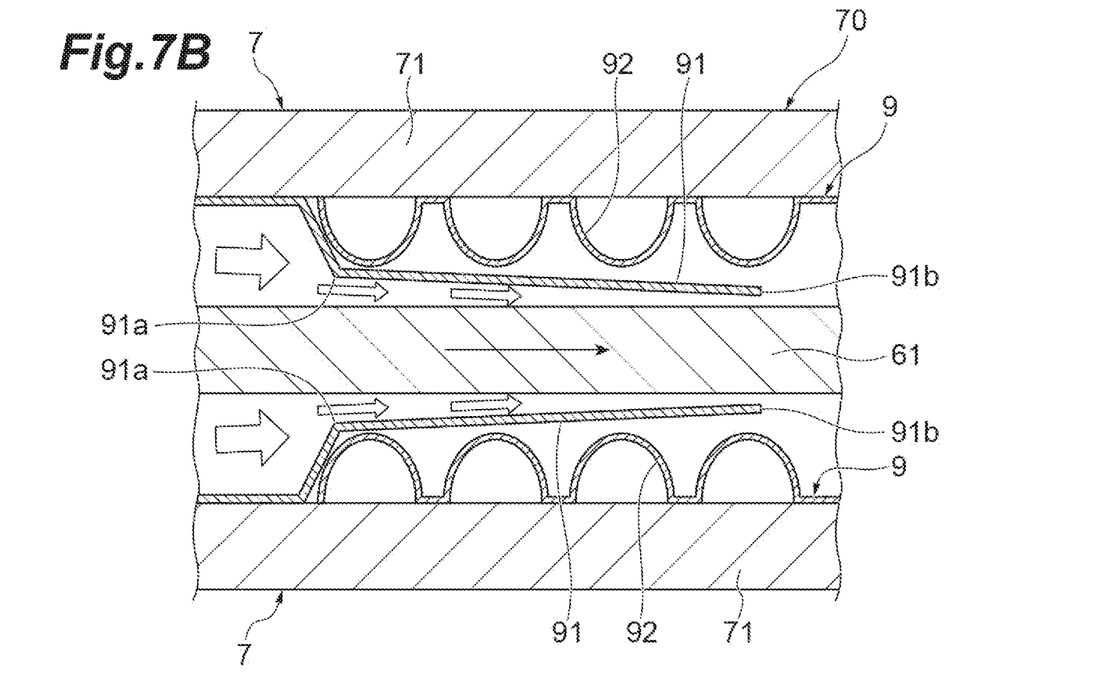
FIG. 7B illustrates an example thrust air bearing installed in a rotating machine in a cross-sectional view taken along line b-b of FIG. 7A.

As illustrated in FIG. 7B, when rotation starts along with the rotation of the rotating shaft 6, air pressure is applied to the root portion 91a of the top foil portion 91, thereby producing a wedge effect. The leading end portion 91b of the top foil portion 91 is held spaced from the thrust collar 61 due to the wedge effect. When the rotating shaft 6 tries to shift in the direction of the axis L (thrust direction), the thrust collar 61 approaches the top foil portions 91 on one side. As a result, the top foil portions 91 are buffered by the undulating bump foil portions 92, so that the shifting of the rotating shaft 6 in the thrust direction is suppressed.

The action and effect of the thrust air bearings 7 above will be described. The thrust air bearing 7 includes the foil units 9 with the top foil portion 91 and the bump foil portion 92 of each foil unit 9 being integrally provided. That is, by attaching one foil unit 9, the top foil portion 91 and the bump foil portion 92 can be attached without misalignment. The attachment of the bump foil portions 92 and the top foil portions 91 is thus facilitated compared to a case in which the bump foils and the top foils are individually attached. Additionally, disposing the foil units 9 by arranging them in predetermined positions completes the installation of all of the top foil portions 91 and the bump foil portions 92.

Furthermore, the foil units 9 of the thrust air bearing 7 are removable from the base plate 71. As a result, when there is a defect in the foil unit 9, the defective foil unit 9 can be removed from the base plate 71, and can be easily changed to a new foil unit 9. For example, in a resting state, the top foil portions 91 are in contact with the bump foil portions 92, and are separated when the rotating shaft 6 rotates. That is, the top foil portions 91 are repeatedly brought into contact with and separated from the bump foil portions 92, so that the plating and the like on the surface may be removed. In such thrust air bearing 7, the defective foil units 9 alone can be changed during maintenance, which is very efficient.

The positioning grooves 72 of the thrust air bearing 7 are provided extending in the radial direction RD of the annular base plate 71. The fix receiving portion 93 includes the engaging projection portion 94 that engages with the positioning groove 72. The foil units 9 are positioned by the fix receiving portions 93 that are fitted in the positioning grooves 72, and the positioning grooves 72 are provided extending in the radial direction RD. As a result, positional misalignment in a direction intersecting the radial direction RD, for example, the circumferential direction CD can be suppressed.

The fix receiving portion 93 of the foil unit 9 includes the engaging projection portion 94 that engages with the positioning groove 72 tapered in the radial direction RD. The engaging projection portion 94 is tapered to engage with the positioning groove 72. Thus, when the engaging projection portion 94 is pressure bonded to the positioning groove 72 by the foil fixing portion 10, the position of the engaging projection portion 94 is corrected by the synergistic effect of the tapered shape of the engaging projection portion 94 and the tapered shape of the positioning groove 72 to thereby enable positional misalignment in the radial direction RD to be suppressed.

The inclined surfaces 72f of the positioning groove 72 are respectively formed on the side portions 72b facing each other in the circumferential direction CD. The engaging projection portion 94 is inclined so as to engage with the pair of inclined surfaces 72f. Thus, when the engaging projection portion 94 is pressure bonded to the positioning groove 72 by the foil fixing portion 10, the position of the engaging projection portion 94 is corrected by the synergistic effect of the inclination of the engaging projection portion 94 and the inclination of the inclined surfaces 72f of the positioning groove 72 to thereby enable positional misalignment in the circumferential direction CD to be suppressed.

There is the gap S, which extends in the radial direction RD, between the bottom portion 72a of the positioning groove 72 and the engaging projection portion 94. A cooling passage through which air can pass can be formed by the gap S, so that a heat removal function can be performed.

The outer end portion 72d of the positioning groove 72 is provided with the bulged portion 72g that forms the gap region AR, so that the engaging projection portion 94 can be easily pulled out using the gap region AR when it is pulled out the engaging projection portion 94.

Figure 8:
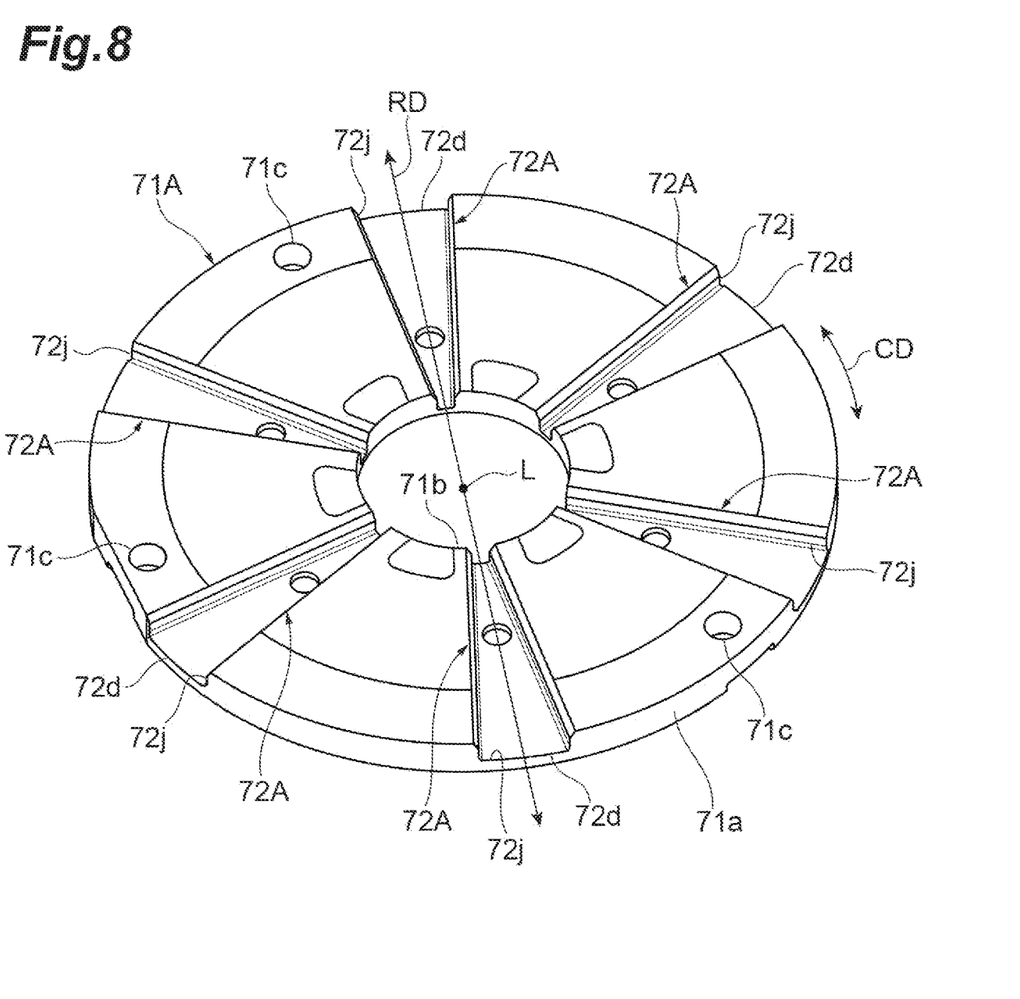
FIG. 8 is a perspective view illustrating an example base plate of an example thrust air bearing.

Another example thrust air bearing has a base plate 71A with a positioning groove 72A illustrated in FIG. 8. The thrust air bearing shares the same structure and elements with the thrust air bearing 7 described above, and shares the same action and effect produced by the same structure and elements except for the base plate 71A. Thus, with reference to FIG. 8, the base plate 71A will be mainly described, focusing on the differences, with the same reference signs used for the same structure and elements, and detailed description thereof being omitted.

The base plate 71A includes the outer circumferential edge 71a and the inner circumferential edge 71b opposite the outer circumferential edge 71a in the radial direction RD. The outer end portion 72d of the positioning groove 72A reaches the outer circumferential edge 71a of the base plate 71A and is open to form an insertion opening 72j. The engaging projection portion 94 of the foil unit 9 can be inserted from the insertion opening 72j.

The engaging projection portion 94 of the foil unit 9 can be attached by inserting the engaging projection portion 94 into the insertion opening 72j from a lateral side which does not interfere with other foil units 9, so that the assembly of the thrust air bearing 7 is facilitated.

It is to be understood that not all aspects, advantages and features described herein may necessarily be achieved by, or included in, any one particular example. Indeed, having described and illustrated various examples herein, it should be apparent that other examples may be modified in arrangement and detail. For example, although the above examples have been described as a thrust air bearing installed in an electrically-assisted turbocharger as an example of a rotating machine, some examples can be widely applied to thrust air bearings that rotatably support a rotating shaft.

What is claimed is:

1. A thrust air bearing comprising:
   a plurality of foil units arranged adjacent to each other in a circle; and
   an annular base plate to which the plurality of foil units are fixed, a foil fixing portion configured to removably fix the foil unit to the base plate,
   wherein each foil unit includes:
   a top foil portion;
   a bump foil portion integrally provided with the top foil portion and disposed opposite the top foil portion in a circumferential direction of the circle; and
   wherein the top foil portion of each foil unit lies on top of the bump foil portion of an adjacent foil unit.

2. The thrust air bearing according to claim 1,
   wherein each foil unit includes a fix receiving portion provided between the top foil portion and the bump foil portion, and
   wherein the fix receiving portion is located between the base plate and the foil fixing portion to be attached to the base plate by the foil fixing portion.

3. A thrust air bearing comprising:
   a plurality of foil units arranged adjacent to each other in a circle;
   an annular base plate to which the plurality of foil units are fixed; and
   a foil fixing portion fixing each foil unit to the base plate,
   wherein each foil unit includes a top foil portion, and a bump foil portion integrally provided with the top foil portion and disposed opposite the top foil portion in a circumferential direction of the circle,
   wherein the top foil portion of each foil unit lies on top of the bump foil portion of an adjacent foil unit,
   wherein each foil unit includes a fix receiving portion provided between the top foil portion and the bump foil portion,
   wherein the base plate includes a positioning groove in which the fix receiving portion fits,
   wherein the positioning groove extends in a radial direction of the annular base plate, and
   wherein the fix receiving portion includes an engaging projection portion engaging with the positioning groove, and a receiving recess portion with which the foil fixing portion engages on a side opposite the engaging projection portion.

4. The thrust air bearing according to claim 3,
   wherein the base plate includes an outer circumferential edge and an inner circumferential edge opposite the outer circumferential edge in the radial direction,
   wherein the positioning groove is tapered such that a width in the circumferential direction of the base plate increases from an inner end portion located adjacent to the inner circumferential edge to an outer end portion located toward the outer circumferential edge, and
   wherein the engaging projection portion is tapered to engage with the positioning groove and is pressure bonded to the positioning groove by the foil fixing portion.

5. The thrust air bearing according to claim 4,
   wherein the positioning groove includes a bottom portion, and side portions rising from the bottom portion and facing each other in the circumferential direction,
   wherein the side portions include inclined surfaces facing each other such that a width of the positioning groove in the circumferential direction uniformly increases along the side portions away from the bottom portion, and
   wherein the engaging projection portion is configured to engage with the inclined surfaces, and is pressure bonded to the inclined surfaces by the foil fixing portion.

6. The thrust air bearing according to claim 3, wherein the positioning groove includes a bottom portion, and a gap extends in the radial direction between the bottom portion and the engaging projection portion.

7. The thrust air bearing according to claim 3, wherein the positioning groove includes a bulged portion spaced from the engaging projection portion in the circumferential direction and forming a gap region.

8. The thrust air bearing according to claim 3,
   wherein the base plate includes an outer circumferential edge and an inner circumferential edge opposite the outer circumferential edge in the radial direction, and
   wherein the positioning groove includes an insertion opening open at the outer circumferential edge, and the engaging projection portion is insertable from the insertion opening.

9. A thrust air bearing comprising:
   a base plate including an inner circumferential surface located around a shaft, wherein the base plate includes a positioning groove;
   a plurality of foil units facing the base plate in an axial direction of the shaft and annularly located around the inner circumferential surface of the base plate, wherein each of the foil units includes a top foil portion, a bump foil portion and a fix receiving portion located between the top foil portion and the bump foil portion; and
   a foil fixing portion that faces the fix receiving portion in the axial direction and attaches the fix receiving portion to the base plate,
   wherein the fix receiving portion includes a projection portion protruding from the top foil portion and the bump foil portion, and
   wherein the projection portion is fitted in and pressure bonded to the positioning groove of the base plate by the foil fixing portion.

10. The thrust air bearing according to claim 9,
    wherein the top foil portion of a first foil unit lies on top of the bump foil portion of a second foil unit located adjacent to the first foil unit, and
    wherein the top foil portion of the first foil unit faces the bump foil portion of the second foil unit in the axial direction of the shaft.

11. The thrust air bearing according to claim 9, wherein the fix receiving portion includes a recess portion with which the foil fixing portion engages on a side of the fix receiving portion opposite the projection portion.

12. The foil unit according to claim 9,
    wherein the foil unit has an arc-shape, and wherein the bump foil portion is located on a side of the foil unit opposite the top foil portion in a circumferential direction of the foil unit.

13. The foil unit according to claim 12,
wherein the bump foil portion has an undulating plate shape, and
wherein the top foil portion has a flat plate shape.

14. A thrust air bearing comprising:
an annular-shaped base plate including an inner circumferential surface located around a shaft; and
a plurality of foil units facing the base plate in an axial direction of the shaft and annularly located around the inner circumferential surface of the base plate,
wherein each of the foil units includes a top foil portion, a bump foil portion and a fix receiving portion located between the top foil portion and the bump foil portion,
wherein the base plate includes a positioning groove in which the fix receiving portion is fitted to connect the top foil portion and the bump foil portion to the base plate, and
wherein the positioning groove extends from the inner circumferential surface in a radial direction of the base plate.

15. The thrust air bearing according to claim 14,
wherein the base plate includes an outer circumferential surface opposite the inner circumferential surface in the radial direction, and
wherein the positioning groove includes an insertion opening at the outer circumferential surface from which the fix receiving portion is insertable.

16. The thrust air bearing according to claim 14,
wherein the base plate includes an outer circumferential surface opposite the inner circumferential surface in the radial direction,
wherein the positioning groove includes an inner end portion located adjacent to the inner circumferential surface and an outer end portion located toward the outer circumferential surface, and
wherein a width of the positioning groove in a circumferential direction of the base plate increases from the inner end portion to the outer end portion.

17. The foil unit according to claim 14,
wherein the foil unit has an arc-shape, and
wherein the bump foil portion is located on a side of the foil unit opposite the top foil portion in a circumferential direction of the foil unit.

18. A foil unit of a thrust air bearing comprising:
a top foil portion;
a bump foil portion; and
a connecting portion located between and integrally connecting the top foil portion and the bump foil portion,
wherein the connecting portion includes a projection portion protruding from both the top foil portion and the bump foil portion, and a recess portion located on a side of the connecting portion opposite the projection portion.

19. The foil unit according to claim 18,
wherein the foil unit has an arc-shape, and
wherein the bump foil portion is located on a side of the foil unit opposite the top foil portion in a circumferential direction of the foil unit.

20. The foil unit according to claim 19,
wherein the bump foil portion has an undulating plate shape, and
wherein the top foil portion has a flat plate shape.

* * * * *